United States Patent [19]

Garnier et al.

[11] Patent Number: 4,955,305
[45] Date of Patent: Sep. 11, 1990

[54] MODULAR SYSTEM FOR USE WITH X-Y PERIPHERALS

[75] Inventors: Steven F. Garnier, Denver; Robert B. Ton; Vernon S. Turner, both of Arvada; James K. Pilarski, Northglenn; Mark R. Magill, Arvada; Allen J. Murphy, Denver, all of Colo.

[73] Assignee: Melco Industries, Inc., Denver, Colo.

[21] Appl. No.: 249,426

[22] Filed: Sep. 23, 1988

[51] Int. Cl.$^5$ .............................................. D05B 21/00
[52] U.S. Cl. .......................... 112/121.11; 364/167.01
[58] Field of Search ...................... 364/167.01, 474.34, 364/190; 112/103, 121.11, 121.12

[56] References Cited

U.S. PATENT DOCUMENTS

| | | | |
|---|---|---|---|
| 4,002,128 | 1/1977 | Yanikoski | 112/121.11 |
| 4,369,722 | 1/1983 | Nishida et al. | 112/103 |
| 4,388,884 | 6/1983 | Hirota et al. | 112/121.12 |
| 4,404,509 | 9/1983 | Hartwig | 112/121.12 |
| 4,429,364 | 1/1984 | Maruyama et al. | 112/121.11 |
| 4,546,434 | 10/1985 | Gioello | 364/192 |
| 4,561,050 | 12/1985 | Iguchi et al. | 364/474.34 |
| 4,589,359 | 5/1986 | Scholl | 112/121.12 |
| 4,646,246 | 2/1987 | Kinoshita et al. | 112/121.12 |
| 4,665,846 | 5/1987 | Takano et al. | 112/121.12 |
| 4,688,498 | 8/1987 | Carlson | 112/121.12 |
| 4,691,649 | 9/1987 | Takano et al. | 112/121.12 |
| 4,692,871 | 9/1987 | Kinosita et al. | 112/121.12 |
| 4,720,795 | 1/1988 | Kinoshita et al. | 112/121.12 |
| 4,741,786 | 5/1988 | Hashimoto et al. | 112/103 |
| 4,757,773 | 7/1988 | Nomura et al. | 112/121.11 |
| 4,807,143 | 2/1989 | Matsuura | 364/468 |
| 4,821,662 | 4/1989 | Pongrass et al. | 112/103 |
| 4,823,714 | 4/1989 | Yokoe et al. | 112/103 |
| 4,825,784 | 5/1989 | Nomoto | 112/103 |
| 4,841,891 | 6/1989 | Hashimoto et al. | 112/121.1 |

OTHER PUBLICATIONS

Advertising literature produced by BROTHER, a manufacturer of automatic sewing machine equipment.

*Primary Examiner*—Allen MacDonald
*Attorney, Agent, or Firm*—Sheridan, Ross & McIntosh

[57] ABSTRACT

A modular system for use with X-Y peripherals is provided. The system includes a master controller operatively connected to one or more slave X-Y peripherals in a network. Different types of slave X-Y peripherals are accommodated by the system, e.g. sewing machines and engravers. Each slave X-Y peripheral has a unique address for independent communication with the master controller. The master controller tracks the functional relationship existing between it and each slave X-Y peripheral using state architecture. Servo control of a tool or head in an X-Y peripheral is also disclosed. The tool is movable in a Z dimension relative to a workpiece residing in an X-Y plane. Method and apparatus are also provided for positioning a carriage of an X-Y peripheral at a home or reference position in one or more dimensions.

7 Claims, 7 Drawing Sheets

Fig. 3

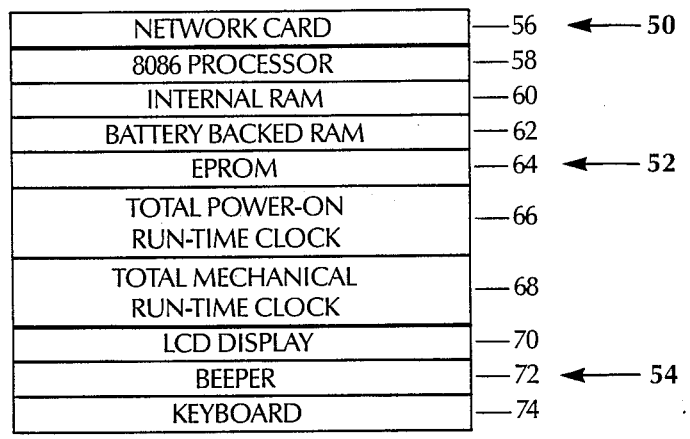

Fig. 4

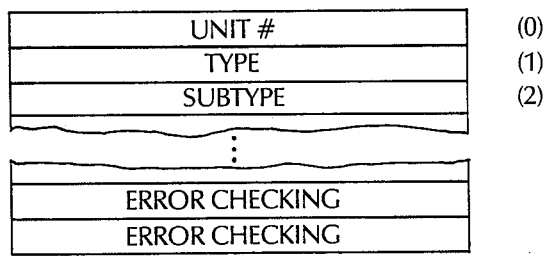

Fig. 5

```
/* state machine communications area */
struct {
        int state;                          /* current state */
        int substate;                       /* current substate */
        unsigned int pakno;                 /* packet number */
        int running;                        /* unit running flag */
        unsigned char last_type;            /* last message type received */
        unsigned char last_subtype;         /* last message subtype received */
        int queue;                          /* enable/disable queue */
        char al_str[64];                    /* autoload command string */
        int dvalid;                         /* directory valid */
} NC[16];
```

MODULAR SYSTEM FOR USE WITH X-Y PERIPHERALS

FIELD OF THE INVENTION

The present invention relates to a modular system that employs a master controller to control a variable number of modular X-Y peripherals. The invention further relates to a method and apparatus for attaining a home or reference position in a computer controlled X-Y peripheral. Further, the present invention relates to a servo system for controlling the position and velocity of a head or tool in a computer controlled X-Y peripheral.

BACKGROUND OF THE INVENTION

An X-Y peripheral is characterized by X-Y movement of a workpiece relative to a tool to achieve a desired pattern thereon or record a desired pattern therefrom. Alternatively, the tool can be moved in an X-Y fashion relative to the workpiece. Exemplary X-Y peripherals are sewing machines, engravers, digitizers and pen platters.

Exemplary of current systems for controlling X-Y peripherals are the computer controlled sewing machine systems that employ an architecture whereby a single master controller manages a non-variable number of sewing machine heads. As a consequence of this, there are a plurality of computer controlled sewing machine systems. A consumer can therefore purchase a computer controlled sewing machine system that includes a master controller and a sufficient number of sewing machine heads to satisfy his current production requirements. For example, a consumer with relatively small production requirements can purchase a computer controlled sewing machine that employs a master controller and a single sewing machine head. In contrast, a high volume operation would most likely purchase a computer controlled sewing machine system that has, perhaps, four or more sewing machine heads controlled by a master controller. However, such computer controlled sewing machine systems have several drawbacks. For instance, such systems do not address the future production requirements of the consumer in the most efficient manner. For example, if the consumer's production requirements at the time of purchase dictated a computer controlled sewing machine system having a master controller and two sewing machine heads, but production requirements had increased to the point where a three head system was required then the consumer has, as of the present, two possible options. First, the consumer can purchase another computer controlled sewing machine system having a controller and a single sewing machine head. In this scenario, the consumer whose production requirements necessitated the addition of a single head now has two heads and two controllers. Thus, the consumer has been placed in the position of having to purchase, due to the current architectures, an additional controller. A further disadvantage of such a configuration is that it requires either two operators, one to interface with each controller, or a single operator multiplexing his time between each controller. Second, the consumer can trade in his two head system at, most likely, a discount from the original purchase price, for a three head system. While the consumer now possesses a system comprised of the minimum number of components to satisfy his new requirements, i.e. three heads and a controller, he has lost the difference between the original purchase price for the two head system and the trade in or resale price. Alternatively, the consumer could initially purchase a three head system thereby anticipating an increase in future production requirements. In this instance the consumer must suffer the initial cost of a three head system when only a two head system is required. Consequently, the consumer is placed in the position of having to purchase unnecessary equipment. The present architecture also has several inefficiencies or disadvantages when viewed from the manufacturers perspective. Specifically, each new computer controlled sewing machine system necessitates additional research and development, production and maintenance costs. For example, if a manufacturer produces a two head system and wishes to offer to a three head system he, most likely, must suffer the research and development costs of upgrading the two head hardware and software to accommodate the additional head, the cost of a new production line, and the expense of maintaining two systems, i.e. the two head system and three head system. Consequently, the present architecture employed in systems for controlling X-Y peripherals lacks the flexibility to meet the necessarily unpredictable future production requirements of the consumer. Further, due to this lack of flexibility, there are unnecessary costs and inefficiencies imposed on both the consumer and the manufacturer or producer of systems for controlling X-Y peripherals. Therefore, there exists a need for a system for controlling X-Y peripherals that is capable of meeting both the current and future production requirements of the consumer while minimizing the up-front or current cost thereof. Further, there is a need for a system for controlling X-Y peripherals that reduces the research and development, production and maintenance costs to the manufacturer.

The present architecture employed in systems for controlling X-Y peripherals, and computer controlled sewing machine systems in particular, does not discriminate between the individual heads. Consequently, the operation of any one head is dependent upon the operation of every other head in the system. Due to this lack of discrimination, each head in a multi-head configuration must perform the same function. Thus, production is dependent upon the architecture employed in the system rather than upon the requirements for the products being produced by the system. Hence, the heads in such systems cannot be utilized in their most cost effective or efficient manner. Similarly, if a single head needs to be idled for maintenance purposes or the like then, in a system employing the current architecture, all of the other heads must also be idled while the problem is corrected. Again, the throughput or production of the system is constrained by the current architecture employed in such systems. Specifically, the entire production of the system is idled due to a single head malfunction. Consequently, the non-malfunctioning heads are not used in the most time effective and, hence, cost effective manner. Therefore, there exists a need for a system for controlling X-Y peripherals that provides independent head control to increase the flexibility of the system and thereby allow each head and, hence, the system to be used in a more efficient and productive manner.

Presently, systems for controlling X-Y peripherals employ a controller to manage one type of X-Y peripheral. Exemplary of such a system is one that is comprised of a single controller and one or more sewing machines. Similarly, there are systems available for exclusively controlling other types of X-Y peripherals. For example, there are systems for exclusively controlling digitizers, engravers and plotters. Presently, however, a consumer must purchase a separate controller for each different type of X-Y peripheral that he wishes to utilize. For example, if a consumer desires or needs a sewing machine system and a engraving system then he must purchase both a sewing machine system having a controller with one or more sewing machine peripherals and a separate engraving system having another controller and one or more engravers. Consequently, the consumer must bear the cost of two controllers for managing two types of X-Y peripherals, the sewing machine and the engraver. Further, manufacturers of several types of X-Y peripherals are placed in the position of developing, producing and maintaining controllers for each different X-Y peripheral type. Thus, there exists the need for a controller that is capable of coordinating or managing a system comprised of one or more different types of X-Y peripherals, thus reducing costs to both the consumer and the manufacturer and further increasing the flexibility of a consumer's system.

Currently, "BARUDAN" manufactures a computer controlled sewing machine system comprised of a host computer or controller that transmits data files to one or more stand alone sewing machines. Since the sewing machine peripherals are stand alone machines, they are capable of sewing or embroidering without any communication from the host computer. Consequently, the sewing machine peripherals in such a system must, in and of themselves, include the hardware and software necessary to perform stitching or embroidering operations. Hence, the hardware and software necessary to stand alone operation is repeated in each sewing machine peripheral in such a system. The cost of the hardware and software necessary for the stand alone operation of each peripheral is, again, borne by the consumer of such systems. Further, data files containing stitching information are typically sent to the sewing machine peripherals in a compressed format thereby requiring an apparatus at each sewing machine peripheral to decompress the data. Thus, there exists the need for a computer controlled sewing machine system where the decompression and stand alone hardware and/or software necessary to the operation of the sewing machine peripherals is centrally located thereby eliminating the need for repeating such hardware and/or software in each sewing machine peripheral. Thus, the cost to the consumer and the cost of development, manufacturing and maintenance to the manufacturer can be further reduced.

It is also presently known that large computer systems employ a disk controller intermediate the main frame computer and the disk drives. The disk controller routes information from the main frame to the appropriate disk drive. Typically, the disk controller manages one or more strings of disk drive where each string is composed of a variable disk drives that may be in varying operational states.

An additional aspect of computer controlled X-Y peripherals is the servo control employed to control the head or tool of the X-Y peripheral. In particular, reciprocation of the needle or head in a computer controlled sewing machine requires both speed control and position control. Speed control is necessary to coordinate the reciprocation of the needle with the movement of the carriage to achieve the desired embroidery pattern. Position control, on the other hand, is required where a color change head is employed in the computer controlled sewing machine. A color change head allows the computer to change thread colors during the embroidering of a design or after the sewing of a first design but before the sewing or embroidering of a second design. Position control is necessary with color change heads because the head must be positioned within $\pm 20/20$ of top dead center in order to effect a color change. Further, various maintenance procedures also require that the head position be controlled. A presently known head servo system employs a stepper motor which provides good positioning ability, but exhibits poor speed or velocity control at high rpm's due to the torque/speed curves associated with stepper motors. Another system employs a unidirectional motor in conjunction with a brake and a clutch. This servo system provided good speed control, but position control is difficult due to the fact that the motor, the brake and the clutch each must be individually adjusted in order to achieve good positioning control. Consequently, there exists a need for a head servo control system that provides both speed and positioning control. Further, there is a need for a head servo control system that reduces the number of mechanical components and, hence, the number of control signals necessary to control each component.

Typically, computer controlled X-Y peripherals require a home or reference position from which movement of a carriage holding a workpiece can be coordinated. Movement of the carriage, and hence the workpiece, relative to a head or tool is used to produce a desired design on the workpiece. Conversely, the head or tool can be moved relative to the workpiece in order to achieve a pattern or design on the workpiece. As such, the carriage is placed at the home position prior to the execution of a design on the workpiece. It is also necessary to place the carriage at the home position when its current position is unknown. For example, at power up or following a power failure recovery. Typically, the computer controlled X-Y peripheral includes hardware and/or software to control the X-Y positioning and the velocity of the carriage relative to the home position. Further, such computer controlled X-Y peripherals also, typically, include a separate apparatus for positioning the carriage at the home position. If the standard X-Y positioning and velocity control apparatus could be adapted to move the carriage to home then the special home positioning apparatus employed in current computer controlled X-Y peripherals could be rendered unnecessary thereby reducing, among other things, the cost and complexity of the X-Y peripheral.

SUMMARY OF THE INVENTION

The present invention provides a modular system for use with X-Y peripherals that includes a master controller and one or more X-Y peripherals. More specifically, the master controller is comprised of a network interface whereby it can communicate with each of the X-Y peripherals included in the system. The master controller further includes a processor which is used to manage and communicate with each of the X-Y peripherals. Preferably included in the master controller is a master controller operator interface that allows a master controller operator to dynamically interact with the system. The master controller processor, if a master controller operator interface is included in the system, manages or processes inputs from this interface that are relevant to the management or control of the X-Y peripherals included in the system. A communication path is provided between the master controller and each of the X-Y peripherals by a cable or similar device. The system further includes one or more X-Y peripherals each of which includes a peripheral network interface for, via the cable, communicating with the master controller. Further, each of the X-Y peripherals includes a processor for, among other things, managing communications by way of the peripheral network interface with the master controller. Preferably, each of the X-Y peripherals in the system further includes a peripheral operator interface which allows a peripheral operator to dynamically interact with the system. If such a peripheral operator interface is provided, the processor also manages communications with this interface.

Each of the X-Y peripherals included in the system is given a unique physical address thereby allowing the master controller to communicate with one of the X-Y peripherals to the exclusion of all the other peripherals in the system. Thus, the system provides independent control of each X-Y peripheral in the system. Consequently, a consumer can design or modify his or her particular system in a modular or incremental fashion to satisfy both current and future production requirements. Thus, the up-front cost to the consumer of the present system is reduced. Further, the cost of research and development, manufacturing and maintenance to the manufacturer is likewise reduced. Providing a unique physical address to each of the X-Y peripherals included in the system of the present invention, however, implies that each X-Y peripheral can be in a different functional relationship relative to the master controller. For example, one of the X-Y peripherals may be idle while another may be receiving data and yet another may be requesting data. Consequently, as the master controller services each of the X-Y peripherals in the system it must know the current functional status of the X-Y peripheral in order to effectively manage or communicate with the X-Y peripheral. Consequently, the system of the present invention implements a state concept whereby the master controller tracks the status of each of the X-Y peripherals included in the system. More specifically, the master controller tracks the state existing between itself and each X-Y peripheral in the system. Consequently, states, as used hereinafter, refers to an internal mechanism of the master controller whereby the functional relationship between it and each X-Y peripheral in the system is tracked.

The master controller services each of the enabled X-Y peripherals in the system in a round-robin fashion. The service performed on the selected peripheral is determined by the current state of the X-Y peripheral.

Information is transmitted between the master controller and any X-Y peripheral included in the system by information packets. Each information packet includes a unit number field for holding the unique physical address of the X-Y peripheral with which the information packet is associated. Thus, the master controller can identify the X-Y peripheral from which an information packet is received. Likewise, the appropriate X-Y peripheral can identify information packets directed to it by the master controller. The information packet also includes a type field or fields used by both the master controller and the X-Y peripherals as decision making tools. For example, the master controller upon receiving an information packet with a particular type will take a first action but if the type is changed or altered it may take a second action. The information packet further includes, if necessary, data that is relevant to the type of the information packet.

Related to the round-robin servicing of each of the X-Y peripherals in the system by the master controller is locked or unlocked relationship between the master controller and any particular X-Y peripheral. More specifically, during the transfer of any one information packet between the master controller is locked into communication with the selected X-Y peripheral to the exclusion of all the other X-Y peripherals. Conversely, when the master controller is not transmitting an information packet to any particular X-Y peripheral in the system then the master controller is unlocked and proceeds in the round-robin fashion to service other X-Y peripherals in the system. The master controller can be locked into communication with a selected X-Y peripheral for the transfer of several packets of information thereby providing a mechanism for transferring large amounts of information.

The operation of the system of the present invention can be broken down into two aspects: configuration and normal operation. Normal operation can be further broken down into the initialization and functional phases. Configuration involves connecting the master controller to each of the X-Y peripherals included in the system using the cable. Each X-Y peripheral in the system is given a unique physical address. All of the X-Y peripherals are, initially, in a disabled state when the master controller is powered up for the first time. Consequently, no communication of any kind is occurring between the master controller and the X-Y peripherals included in the system. Peripherals, in the preferred embodiment, are enabled by a master controller operator utilizing the master controller operator interface associated with the master controller. Once an X-Y peripheral in the system is enabled, the master controller will then attempt to communicate with the enabled X-Y peripheral. The master controller proceeds to service the enabled X-Y peripherals in the round-robin fashion previously described.

When the system of the present invention is in normal operation there are two communication scenarios. First, the master controller sends an information packet to a selected X-Y peripheral in the system whereby the peripheral is queried to determine if it needs any service. The selected X-Y peripheral then responds with an information packet requesting a particular service or refusing any service. Second, the master controller can inform a selected peripheral by way of an information packet that it desires to transmit information to it. The selected peripheral can then respond with an information packet that either informs the master controller that it can proceed or denies the requested transfer.

With regard to the first communication scenario, a general polling state, state 0, is utilized by the master controller. State 0 includes substates which more definitely define the status of the selected X-Y peripheral. Generally, state 0 involves the transmission of a general poll information packet to a selected X-Y peripheral in the system. The selected X-Y peripheral, in turn, recognizes the information packet as a general poll packet, preferably, by using the type field or fields contained in the information packet. In the preferred embodiment of the invention, the selected X-Y peripheral responds to the general poll packet with a packet requesting either the downloading of the selected peripherals application software or the auto-loading of design data. The application software is used by the X-Y peripheral to perform its designated X-Y function. The design data defines the pattern to be produced on a workpiece. Although requests for other types of information are feasible. Depending upon whether the downloading of application software or auto-loading of design data is requested the the state, as tracked by the master controller, changes relative to the selected X-Y peripheral. More specifically, if the selected X-Y peripheral requests the downloading of application software then the relationship between the master controller and the selected X-Y peripheral is defined, in the master controller, by state 1. If, on the other hand, the selected X-Y peripheral requests the auto-downloading of design data the relationship between the master controller and the selected X-Y peripheral is defined, in the master controller, by state 2.

State 1 is used to download application software from the master controller to the selected X-Y peripheral. However, as previously mentioned, state 1 could be used to download other information depending upon the desired system. State 1 involves the transmission of one or more packets of information containing the selected peripherals application software. Typically, the master controller is locked when downloading application software to a selected X-Y peripheral. Generally, for each packet transmitted by the master controller to the selected X-Y peripheral the master controller receives a response packet from the selected X-Y peripheral. Consequently, if, for example, the transmitted packet is not completely received then the response packet can be utilized by the master controller to attempt re-transmission of the packet. Further, the response packet can be used to indicate to the master controller when all of the application software has been received. Consequently, the need to provide permanent storage for the application program in each of the X-Y peripherals in a system is eliminated. Rather, the present invention stores one copy of the application software for each type of X-Y peripheral included in the system. In addition, updates to the application software of any particular X-Y peripheral type can be done more efficiently on the single copy maintained in the master controller. Hence, the need for updating copies of the application software in each of the X-Y peripherals in known systems for controlling X-Y peripherals is eliminated.

State 2 is used for the auto-downloading of design data. However, as previously mentioned, state 2 can be utilized to effect other types of information transfers depending upon the requirements of the system. State 2 is generally used for transferring information to be used by the particular type of X-Y peripheral. Consequently, the application program or software associated with the particular type of X-Y peripheral must be downloaded and running in the selected X-Y peripheral before state 2 can be utilized to download information peculiar to that type of X-Y peripheral. The master controller keeps track of whether the application software for a selected X-Y peripheral has been downloaded and is running by maintaining a flag associated with each of the X-Y peripherals in the system. State 2 commences with the transmission of an information packet requesting permission to download. Thus, even though the selected peripheral requested the auto-downloading of design data the master controller, in turn, requests permission to download the design data. This allows the master controller to inform the selected X-Y peripheral of, for example, the size of the requested design data. The selected X-Y peripheral then responds with an information packet either informing the master controller that it can proceed with the auto-download or rejecting the request. If, the request is approved then the master controller proceeds to auto-download the requested design data in a similar fashion to that employed to download the application software to the selected X-Y peripheral. Notably, design data that is transmitted to a selected X-Y peripheral using state 2 under either the first or second scenario is initially in a compressed format. The master controller operates to decompress the design data prior to transmission to the selected X-Y peripheral. Thus, the need for a decompression apparatus in each X-Y peripheral in the system is eliminated.

The second communication scenario possible in the system allows the master controller to transfer information to a selected peripheral. Thus, the selected peripheral is not polled to determine whether it requires servicing, but rather the master controller proceeds on its own initiative. Typically, this communication scenario is utilized to issue things like commands or design data to the selected X-Y peripheral and can be defined by a master controller operator using the master controller operator interface. The information is downloaded to the selected peripheral using the previously described state 2. Thus, for information transfers using this scenario the selected peripheral is placed in state 2 so that when the master controller services the selected X-Y peripheral servicing will begin in state 2. Notably, the selected peripheral can only be placed in state 2 if the selected peripheral is not currently in a state that cannot be superseded. In a preferred embodiment of the invention, there are four types of information transfers utilized in this this communication scenario. Further, in the preferred embodiment of the invention, each type of X-Y peripheral accommodated by the system preferably possesses application software which processes the four types of information transfers described hereinafter. The four types of information transfers using the second scenario are: send design, autoqueue, autodelete and autosend.

In the preferred embodiment of the invention send design is achieved by a master controller operator interacting with the system by using the master controller operator interface to specify the design data to be sent and the X-Y peripheral to which the design is to be sent. As with the auto-downloading of design data, the send design feature is implemented utilizing the state 2 process.

Autosend is implemented relative to a designated peripheral. In the preferred embodiment of the invention, the designated peripheral is defined by a master controller operator interacting with the system by way of the master controller operator interface. Once there is a designated peripheral the autosend feature can be toggled by a master controller using the master controller operator interface. Autosend, if enabled, involves the automatic sending of design data to the designated peripheral thereby avoiding the need to execute a send design information transfer. Notably, the design data sent in an autosend is created at the master controller and is displayed on the CRT or other output device included in the master controller operate interface. Consequently, a master controller operator can create a design at the master controller and, when satisfied with it, can have it automatically sent to the designated peripheral. Thus, not only must autosend be enabled but another indication by the master controller operator interface is used to indicate when the design being displayed on the CRT is finished. Upon receiving this indication, the design data is automatically sent to the designated peripheral using the previously described state 2 process.

Autoqueue and autodelete can also be toggled by a master controller using the master controller operator interface. In contrast, the autoqueue and autodelete features are not restricted to a designated X-Y peripheral. Although it is possible to restrict autoqueue and autodelete to the designated peripheral. If, the autoqueue feature is enabled then any design sent to the selected X-Y peripheral is queued to run. The autoqueue feature is enabled in the selected X-Y peripheral by sending an appropriate information packet to the selected X-Y peripheral using the previously described state 2. Autodelete, on the other hand, is used to delete design data from the selected X-Y peripheral's memory following the running of the design on the selected X-Y peripheral. Like autoqueue, autodelete is enabled in the selected X-Y peripheral by the transmission, using state 2, of an appropriate information packet that the designated X-Y peripheral can use to enable or disable the autodelete feature.

The tool or head servo invention for X-Y peripherals includes a tool that is movable in the Z-dimension relative to a workpiece that resides in a X-Y plane. For example, in a computer controlled engraver the engraving tool reciprocates in the Z-dimension relative to a piece of metal or like material that is placed in an X-Y plane. The reciprocation of the tool in the Z-dimension resulting in the peening of the metal while X-Y movement of either the tool or the metal provides the desired pattern.

The tool servo invention further includes means for selectively defining a desired position, direction of travel or velocity for the tool in the Z-dimension. The ability to place the tool in either a desired position, direction of travel or velocity being desirable for several reasons. For example, in a computer controlled sewing machine, a particular type of X-Y peripheral, the ability to position the needle or tool within $\pm 2°$ of the top dead center position in its stroke allows a color change head, which automatically changes thread colors, to be utilized. The ability to position the needle can also reduce the downtime associated with maintenance procedures such as hook timing by automatically positioning the needle at critical adjustment points. Further, the ability to also define a desired velocity for the needle allows various parameters such as stitch length to be controlled. The means for selectively defining a desired position, direction of travel or velocity is, preferably, comprised of a head or tool input and a programmable digital computer, responsive to the tool or head input. The head or tool input signal indicates the type of tool control required, e.g. position or velocity, and any relevant information. The computer, in response to the head or tool input signal, communicates with the necessary apparatus to achieve the desired position, direction of travel or velocity.

The tool or head servo invention further includes means that, in response to the means for defining, optimally places the tool in the desired position, direction of travel or velocity in the Z-dimension. The preferred means for optimally placing the tool in the desired state includes a servo motor, drive belt, pulley and main shaft arrangement whereby rotation of the main shaft results in movement of the tool in the Z-dimension. The means for optimally placing the tool in the desired state further includes an encoder which provides information on the current position of the main shaft and, hence, the position of the tool. Further, a proportional-integral-differential controller (PID) is included in the means for optimally placing the tool in the desired state. The PID utilizes both the information provided by the encoder on the actual position of the tool and the information provided by the means for defining on the desired position, direction of travel or velocity for the tool to generate a drive signal that is ultimately applied to the servo motor. The servo motor, in turn, using the previously mentioned mechanical linkage rotates the main shaft in the direction and at the velocity specified by the PID thereby resulting in the tool be placed in the desired state. Thus, the tool or head servo invention provides both position, direction and velocity control (direction being provided by the polarity of the drive signal). Further, the tool servo invention utilizes a single servo motor that is controlled by a single drive signal to achieve the desired position, direction of travel or velocity of a tool in the Z-direction. Hence, the need for coordination of several drive signals to control brakes, clutches, motors and the like is eliminated.

The home positioning invention for X-Y peripherals includes a carriage that is movable relative to a body. In the preferred embodiment, the movement of the carriage is constrained to a single dimension, i.e. the X or Y dimension, by attaching the carriage to a bearing rail. The extent to which the carriage can move along the bearing rail is limited by a pair of mechanical stops located intermediate the ends of the bearing rail. The home positioning invention further includes a means for positioning the carriage at any position intermediate the mechanical stops. The means for positioning, in the preferred embodiment, includes a motor which, in conjunction with a motor pulley, an idler pulley and a drive belt, cooperate to move the carriage along the bearing rail at a velocity and in a direction defined by a drive signal. The preferred embodiment of the means for positioning further includes an encoder that is operatively attached to the motor and is capable of generating information concerning the actual position and direction of travel of the carriage along the bearing rail. In addition, the preferred embodiment of the means for positioning includes a proportional-integral-derivative (PID) controller for generating an optimal drive signal given the actual status and the desired status of the carriage. The actual status includes the actual direction of travel, the actual position and the actual velocity of the carriage. The desired status includes the desired direction of travel, the desired position and the desired velocity for the carriage. The elements of the home positioning invention described thus far are used to position the carriage relative to a tool so that a design or pattern can be worked upon a workpiece attached to the carriage. For example, in a computer controlled sewing machine the carriage, holding a piece of cloth material, is moved from its actual position to a desired position using the PID controller.

The present invention further includes a means for defining the movements necessary to move the carriage from a random position intermediate the mechanical stops to a reference position using the existing means for positioning. Specifically, the means for defining communicates with the PID to achieve the desired movement of the carriage to the home position. Specifically, the communication between the means for defining and the PID includes causing the carriage to move from a random position intermediate the mechanical stops towards a known position, i.e. a mechanical stop, at a defined velocity. The means for defining, by communicating with the PID, monitors the difference between the defined velocity and the actual velocity of the carriage. While the carriage is moving intermediate the mechanical stops the difference between the actual and defined velocities is substantially zero. However, when the carriage engages one of the mechanical stops the difference between the actual and defined velocities increases. Thus, when the difference between the defined and actual velocities exceeds a threshold the carriage is at a known location defined by one of the mechanical stops. The home position being a known distance or delta from the known location of the mechanical stop the carriage can now be moved to the home position. Known X-Y peripherals use apparatus in addition to that described herein in order to place the carriage at the home or reference position. The present invention, in contrast, utilizes the elements described thus far in order to position the carriage at the home or reference position thereby avoiding the need for a special home positioning apparatus and method. Thus, the present invention eliminates the need for a special home positioning system by utilizing the information already provided by the normal or standard positioning system.

BRIEF DESCRIPTION OF THE DRAWINGS

FIG. 3 further illustrates the elements comprising the preferred embodiment of an X-Y peripheral;

FIG. 4 illustrates the preferred format of an information packet for use in communication between the master controller and the X-Y peripherals in the system;

FIG. 5 illustrates the state/substate and type/subtype data structure used by the master controller to coordinate and manage communications with the X-Y peripherals in the system;

DETAILED DESCRIPTION OF THE PREFERRED EMBODIMENTS

Figure 1:
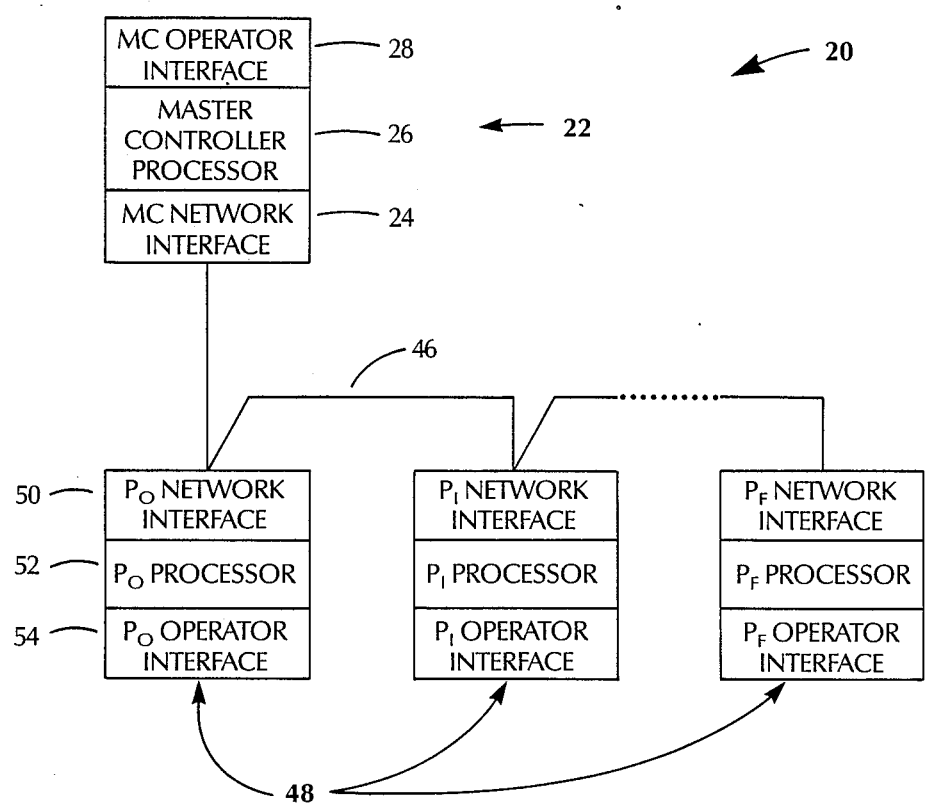
FIG. 1 is a block diagram of the preferred embodiment of a system for controlling X-Y peripherals.

With reference to FIG. 1, a modular system 20 for use with X-Y peripherals, hereinafter system 20, is illustrated. The system 20 is comprised of a master controller 22 for, among other things, managing one or more X-Y peripherals included in the system 20. The term "master" as used herein with reference to the master controller 22 indicates that all communications with any X-Y peripherals are initiated by the master controller 22. The master controller 22 includes a master controller network interface 24 for effecting communications between the master controller 22 and any X-Y peripherals included in the system 20. The network interface 24 preferably implements the RS-422 serial interface protocol. It is contemplated that other interface protocols could readily be employed in the system 20. In addition, the master controller network interface 24, preferably, transfers information between the master controller 22 and any X-Y peripherals included in the system 20 at a rate of 1 million bits per second. The master controller 22 further includes a master controller processor 26 for, among other things, managing any X-Y peripherals included in the system 20 via the master controller network interface 24 and communicating with a master controller by a master controller operator interface. The master controller 22 preferably includes a master controller operator interface 28 for allowing a master controller operator to dynamically interact with the system 20. The master controller operator interface 28 is, preferably, comprised of a monochrome CRT output device and a keyboard input device although any combination of input and output devices that allow a master controller operator to interact with the system are feasible.

Figure 2:
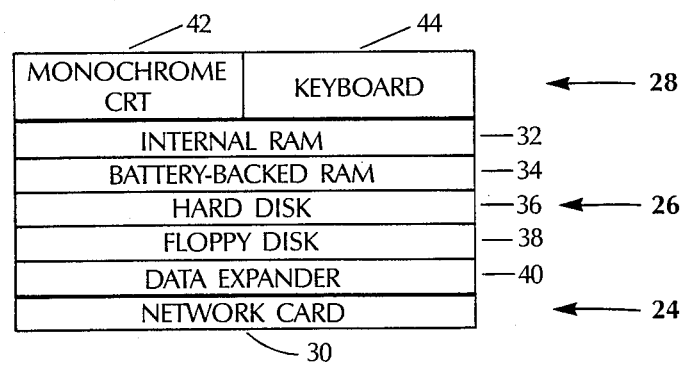
FIG. 2 further illustrates the elements comprising the preferred, embodiment of a master controller.

With reference to FIG. 2, the master controller 22 is, preferably, realized in an IBM-AT or compatible personal computer that includes a network card 30, a 640k internal RAM 32, a 2k battery backed RAM 34, a 20 megabyte hard disk 36, a 3½ inch floppy disk drive 38, a data expander or decompressor 40, and a monochrome CRT 42 and a keyboard 44. The master controller network interface 24 is realized by the network card 30. Similarly, the master controller operator interface 28 is realized by the monochrome CRT 42 and the keyboard 44. The remaining components of the IBM-AT or compatible are primarily incorporated or used in the master controller processor 26 to manage any X-Y peripherals included in the system 20 and communicate with a master controller via the master controller operator interface 28. More specifically, the 640k internal RAM 32 is used, at least in part, to store software that is used by the master controller processor 26 to manage any X-Y peripherals included in the system 20 via the master controller network interface 24 and communicate with a master controller operator by means of the master controller operator interface 28. The 2k battery backed RAM 34 is used by the master controller processor 26 to store, among other things, system configuration variables and the like. The 20 megabyte hard disk 36 can be used by the master controller processor 26 for, among other things, permanent storage of the software utilized to manage any X-Y peripherals included in the system 20, the application software utilized by each different type of X-Y peripheral included in the system 20, and design data used by any X-Y peripherals included in the system 20. Permanent storage of the application software in the master controller 22 eliminates the need for permanent storage of application software in each X-Y peripheral in the system. The 3½ inch floppy disk drive 38 can also provide permanent storage as with the 20 megabyte hard disk, but its primary purpose is to provide a vehicle by which information utilized by either the master controller processor 26 or any X-Y peripherals included in the system 20 can be updated. The data expander or decompressor 40 decompresses data that is stored in a compressed format, typically in either the hard disk drive 36 or floppy disk drive 38, prior to transmission to an X-Y peripheral. Thus, the need for decompression apparatus in each X-Y peripheral in the system is eliminated.

The system further includes a two-wire cable 46 for providing a communication path between the master controller network interface 24 and similar network interfaces associated with each of the X-Y peripherals included in the system 20. The cable 46 is designed to comply with the RS-422 interface protocol implemented in the master controller network interface 24. Again, other interfaces that require different types of communication paths could be implemented without departing from the scope of the present invention. The cable 46 is preferably daisy-chained between each of the X-Y peripherals included in the system 20. In other words, the cable 46 extends from the master controller 22 to a first X-Y peripheral and then to a X-Y second peripheral and so on until the final X-Y peripheral in the system 20 is connected. Other configurations, such as the well-known star configuration where there is a communication path between each node in the network, are also possible. The master controller 22 and each X-Y peripheral in the system 20 define a node.

The system 20 is further comprised of one or more X-Y peripherals 48 for performing X-Y functions. An X-Y peripheral is characterized by X-Y movement of a workpiece relative to a tool in order to establish a pattern thereon. Alternatively, the tool can move in an X-Y fashion relative to the workpiece. A preferred embodiment of the system 20 accommodates up to sixteen of the X-Y peripherals 48. However, a greater number of the X-Y peripherals 48 could be accommodated without departing from the scope of the present invention. Each of the X-Y peripherals 48 are slaves to the master controller 22. Consequently, the X-Y peripherals 48 cannot initiate an information exchange with the master controller 22. Rather, the master controller 22 initiates all information exchanges with each X-Y peripheral 48 included in the system 20. Further, the system 20 is capable of accommodating several different types of X-Y peripherals. For example, the system 20 could accommodate X-Y peripherals like sewing machines and digitizers. Irregardless of the type of X-Y peripheral 48 implemented in the system 20 each includes a peripheral network interface 50 for receiving information from and communicating information to the master controller 22 by way of the cable 46. The peripheral network interface 50 is compatible with the master controller network interface 24 and therefore conducts communications according to the preferred RS-422 serial interface protocol. Each of the peripheral network interfaces 50 can be given a unique physical address for use in conducting communications with the master controller 22. Thus, the master controller 22 can communicate independently with each of the peripherals 48 in the system 20 thereby increasing the flexibility of the system 20 by allowing the system to be built in a modular fashion. More specifically, by giving each X-Y peripheral in the system a unique address the system 20 can be built incrementally. For example, a system having two X-Y peripherals, each with a unique address, can be upgraded to three X-Y peripherals merely by adding a single X-Y peripheral to the system having a unique address relative to the original X-Y peripherals. The physical address is preferably established using a DIP or rotary switch. However, other mechanical or software switches are also feasible. Included in each of the peripherals 48 is a peripheral processor 52 for managing, among other things, communications with the master controller 22 via the peripheral network interface 50. Each of the X-Y peripherals 48 included in the system 20 also, preferably, includes a peripheral operator interface 54 for allowing a peripheral operator to dynamically interact with the system 20.

With reference to FIG. 3, each of the X-Y peripherals 48 is, at least in part, preferably realized by a network card 56, an 8086 processor 58, a 256k internal RAM 60, a 2k battery backed-up RAM 62, an erasable programmable read only memory (EPROM) 64, a total power on run-time clock 66, a total mechanical run-time clock 68, a 16-character LCD display 70, a beeper 72 and a limited keyboard 74 of 10 keys. The peripheral network interface 50 is realized by the network card 56. Similarly, the peripheral operator interface 54 is realized by the 16-character LCD display 70, the beeper 72 and the limited keyboard 74 of ten keys. The remaining components are primarily used by the peripheral processor 52 to manage communications with both the master controller 22 and a peripheral operator by their respective interfaces and control the X-Y peripheral 48 in the accomplishment of its designated task. More specifically, the 8086 processor 58 is responsible for the execution of software resident in the X-Y peripheral 48. The 256k internal RAM 60 is used by the peripheral processor 52 for storing software used in communicating with both the master controller 22 and a peripheral operator by their respective interfaces and data necessary to the accomplishment of the X-Y peripherals task. The 2k battery backed RAM 62 is used by the peripheral processor 52 to store information used to identify the X-Y peripheral 48, i.e. physical address and peripheral type, to the master controller 22 following power-up or a power-failure recovery of the peripheral 48. The EPROM 64 contains a boot or Basic Input-Output System (BIOS) program that is executed by the 8086 microprocessor 58 upon power-up of the X-Y peripheral 48. The BIOS conducts the initial communications between the X-Y peripheral 48 and the master controller 22. In addition, the BIOS program provides primitive input/output operations to a peripheral operator via the peripheral operator interface 54. The total power-on and total mechanical run-time clocks 66, 68 provide information to either a master controller operator or a peripheral operator useful for performing maintenance and the like.

Having described the elements comprising the system 20 it is now necessary to describe the operation of the system 20. First, however, it is necessary to explain the state concept utilized in the operation of the system 20 by the master controller 22 to manage or coordinate the operation of the X-Y peripherals 48. The state concept is necessary because each of the X-Y peripherals 48 in the system 20 is given a unique physical address so that the master controller 22 can communicate with one of the X-Y peripherals 48 to the exclusion of all other X-Y peripherals. As a consequence of the master controller 22 being able to independently communicate with each of the X-Y peripherals 48 in the system the functional relationship between the master controller 22 and each of the X-Y peripherals 48 can be different. For example, in a system comprised of two XY peripherals one X-Y peripheral may be disabled for maintenance purposes and therefore not requiring any servicing by the master controller 22 while the other XY peripheral may be available to perform a new task. Consequently, the state concept, whereby the state or functional relationship existing between the master controller 22 and each of the X-Y peripherals 48 included in the system 20 is tracked by, and internal to, the master controller 22.

Consequently, state, as used hereinafter, refers to an internal mechanism of the master controller 22 whereby the functional relationship between it and each X-Y peripheral in the system is tracked. State architecture further allows the master controller 22 to multitask, i.e. perform tasks other than the management of the X-Y peripherals. For example, the state architecture allows the master controller 22 to switch between the task of managing the X-Y peripherals and a task like allowing an operator to create a design. Notably, the unique physical addresses associated with each of the X-Y peripherals 48 and the resulting independent communication between the master controller 22 and the X-Y peripherals 48 increases the flexibility of the system 20 since each of the X-Y peripherals 48 can be utilized independently of the others. Consequently, the throughput of the system 20 can be optimized.

A substate is also preferably employed in the master controller to more specifically define the functional relationship existing between itself and each of the X-Y peripherals 48 in the system 20. For example, if state 1 is defined to be the functional relationship whereby the master controller 22 is downloading information to a selected X-Y peripheral 48 then a substate can be used to more specifically define the functional relationship existing between the master controller 22 and the selected X-Y peripheral 48 during the downloading. For example, a substate of 2 may indicate that the information has been downloaded to the selected X-Y peripheral and the master controller 22 is waiting for an acknowledgement from the selected X-Y peripheral 48.

The master controller 22 services or does not service, as the case may be, each of the X-Y peripherals 48 in the system 20 in a round-robin or multiplex fashion according to the state existing therebetween. Consequently, the master controller 22 multiplexes its time between each of the enabled X-Y peripherals 48 in the system 20. For example, in a system having two enabled X-Y peripherals the master controller 22 would spend a first portion of its time servicing the first X-Y peripheral and a second portion of its time servicing the second X-Y peripheral.

Information is transferred between the master controller 22 and the X-Y peripherals 48 by information packets. With reference to FIG. 4, the preferred packet format is illustrated. The packet includes a unit number field which contains the unique physical address of the X-Y peripheral 48 with which the packet is associated. Thus, when the master controller 22 outputs an information packet by way of the master controller network interface 24 and the cable 46 the appropriate X-Y peripheral can identify information directed to it. Similarly, when the X-Y peripheral 48 inputs to the master controller 22 an information packet by way of its peripheral network interface 50 and the cable 46 the master controller 22 can identify the source of the information packet. The packet also includes type and subtype fields that can be used by both the master controller 22 and the X-Y peripherals 48 to determine what subsequent action to take. For example, the master controller 22 may send an information packet that is in the nature of a general service inquiry packet and having a type "01" and subtype "01". The X-Y peripheral 48 to which the information packet is directed may then respond with an information packet requesting a download of its application program using an information packet having a type of "01" and a subtype of "02". The master controller 22 upon receiving the information packet utilizes the type and subtype fields to effect the requested transfer. The selected X-Y peripheral could also respond with a number of other information packets having different types and subtypes that would cause the master controller 22 to take different actions. For example, if the selected X-Y peripheral responded with an information packet having a type and subtype that indicated that the peripheral had insufficient resources to accommodate a proposed action then the master controller would analyze the information in the type and subtype fields to make a decision as to the subsequent action to take with the selected X-Y peripheral 48. The preferred packet format also includes a data field for accommodating information that is relevant to the type and subtype of the message. For example, the data field could contain, as indicated by the type and subtype fields, data that is pertinent to the operation of the selected X-Y peripheral 48. Also included in the packet is an error checking field whereby the receptor of an information packet, i.e. either the master controller 22 or a peripheral 48, can determine whether any of the other information in the packet has been corrupted during transmission.

Associated with the round-robin servicing of the X-Y peripherals 48 by the master controller 22 is the lock/unlock concept. In essence, a lock condition occurs when the master controller 22 is communicating with one of the X-Y peripherals 48 to the exclusion of the remaining X-Y peripherals in the system. The locked condition is maintained during the transfer of any one information packet between the master controller 22 and the selected X-Y peripheral 48. The master controller 22 can maintain the locked condition for consecutive information packet transfers with a selected X-Y peripheral 48 if required. For example, the master controller 22 may wish to lock out the other X-Y peripherals when downloading several information packets necessary to the immediate operation of the selected X-Y peripheral 48. If the master controller fails to maintain the lock after the transfer of any one information packet then it will proceed to service other X-Y peripherals 48 in the system 20.

Thus, at any given time the state/substate and type/subtype information can be useful in determining the current status of any one of the X-Y peripherals 48 relative to the master controller 22. It is, however, feasible that the system 20 could be realized using state information alone. The addition of substate, type, and subtype, however, does provide a more easily refinable index as to the current relationship between the master controller 22 and the selected X-Y peripheral 48. With reference to FIG. 5, the data or information structure used by the master controller 22 to track the state/substate and type/subtype information relevant to each peripheral is illustrated.

Figure 6:
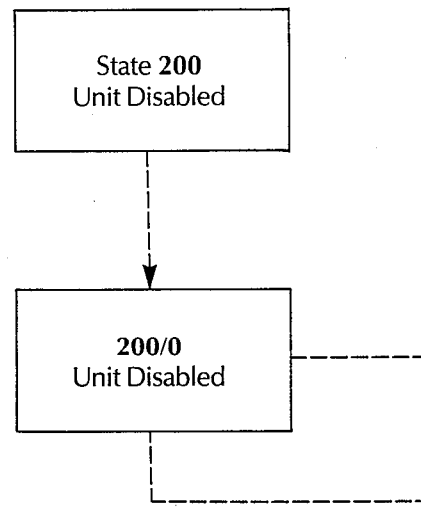
FIGS. 6-9 illustrate the possible state relationships between the master controller and any given X-Y peripheral in the system.

Operation of the preferred system 20 is comprised of configuration and normal operation phases. To configure the system 20 the master controller 22 must be connected to one or more of the X-Y peripherals 48 by the cable 46. Further, the unique physical addresses associated with each of the X-Y peripherals 48 must be established so that the master controller 22 can selectively communicate with any given X-Y peripheral to the exclusion of the remaining X-Y peripherals. With reference to FIG. 6, the initial state relationship between the master controller 22 and each of the X-Y peripherals 48 in the system 20 during configuration is defined by state 200. State 200 indicates that the X-Y peripheral 48 is disabled relative to the master controller 22. Further, the dotted line indicates that the master controller 22 is unlocked and will service the first enabled X-Y peripheral 48 encountered. Thus, an X-Y peripheral in state 200 remains in that state and the master controller proceeds to attempt to service other X-Y peripherals. Further, since all communications between the master controller 22 and the X-Y peripherals 48 must be initiated by the master controller 22 the X-Y peripherals 48 are incapable of forcing any communication with the master controller 22. Consequently, since all of the X-Y peripherals 48 are disabled the master controller 22 is, essentially, idle relative to the X-Y peripherals 48. Enablement is achieved, in the preferred embodiment of the system 20, by way of the master controller operator interface 28. More specifically a master controller operator can, using the keyboard and information supplied on the monochrome CRT, selectively enable or disable each of the X-Y peripherals 48 in the system 20 by setting or resetting, respectively, an enable/disable flag associated with each of the X-Y peripherals 48. Once an X-Y peripheral is enabled its state or relationship relative to the master controller 22 changes from state 200 to state 0/0. The master controller 22 interrogates the enable/disable flag associated with each of the X-Y peripherals 48 in the system before attempting to communicate with the X-Y peripheral 48. Notably, if an X-Y peripheral that does not physically exist, i.e. there is no X-Y peripheral connected to the cable 10 with the specified address, has been enabled by way of the master controller operator interface 28 then the master controller 22 will only try to communicate with the non-existent X-Y peripheral for a specified amount of time before proceeding to interrogate the enable/disable flag associated with the next X-Y peripheral in the aforementioned round-robin fashion. Similarly, the master controller 22 will time out if the selected X-Y peripheral is enabled but not powered up and, hence, non-responsive to attempts at communication. Thus, following configuration all of the X-Y peripherals 48 are either in state 0 or state 200 relative to the master controller 22. Notably, enablement or disablement of an X-Y peripheral is not restricted to the time during which the system 20 is being configured.

In normal operation there are two scenarios whereby information is transferred between the master controller 22 and the X-Y peripherals 48 in the system 20. First, the master controller 22 itself can initiate a transfer of information to one of the X-Y peripherals 48 in the system 20. In the preferred embodiment of the system 20 such transfers are typically initiated by a master controller operator utilizing the master controller operator interface 28. For example, a master controller operator may wish to send data or a command to one of the X-Y peripherals 48 in the system. Thus, there is a path whereby the master controller 22 and, conceivably, a master controller operator using the master controller operator interface 28 can initiate an information transfer with one of the X-Y peripherals 48 in the system 20. Second, the master controller 22 can transfer an information packet to one of the X-Y peripherals to determine whether the select X-Y peripheral requires any servicing. Thus, there is a path whereby each of the X-Y peripherals 48 and, conceivably, a peripheral operator by using the peripheral operator interface 54 can request servicing from the master controller 22. For example, a peripheral operator could request the downloading of particular data from the master controller 22.

Figure 8:
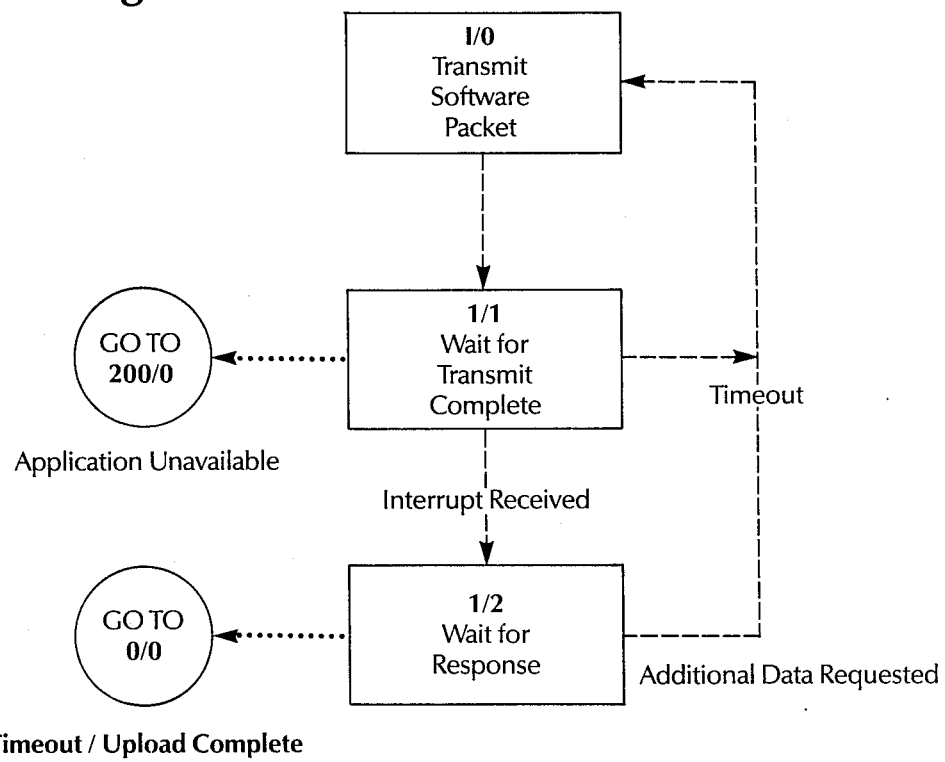
Figure 7:
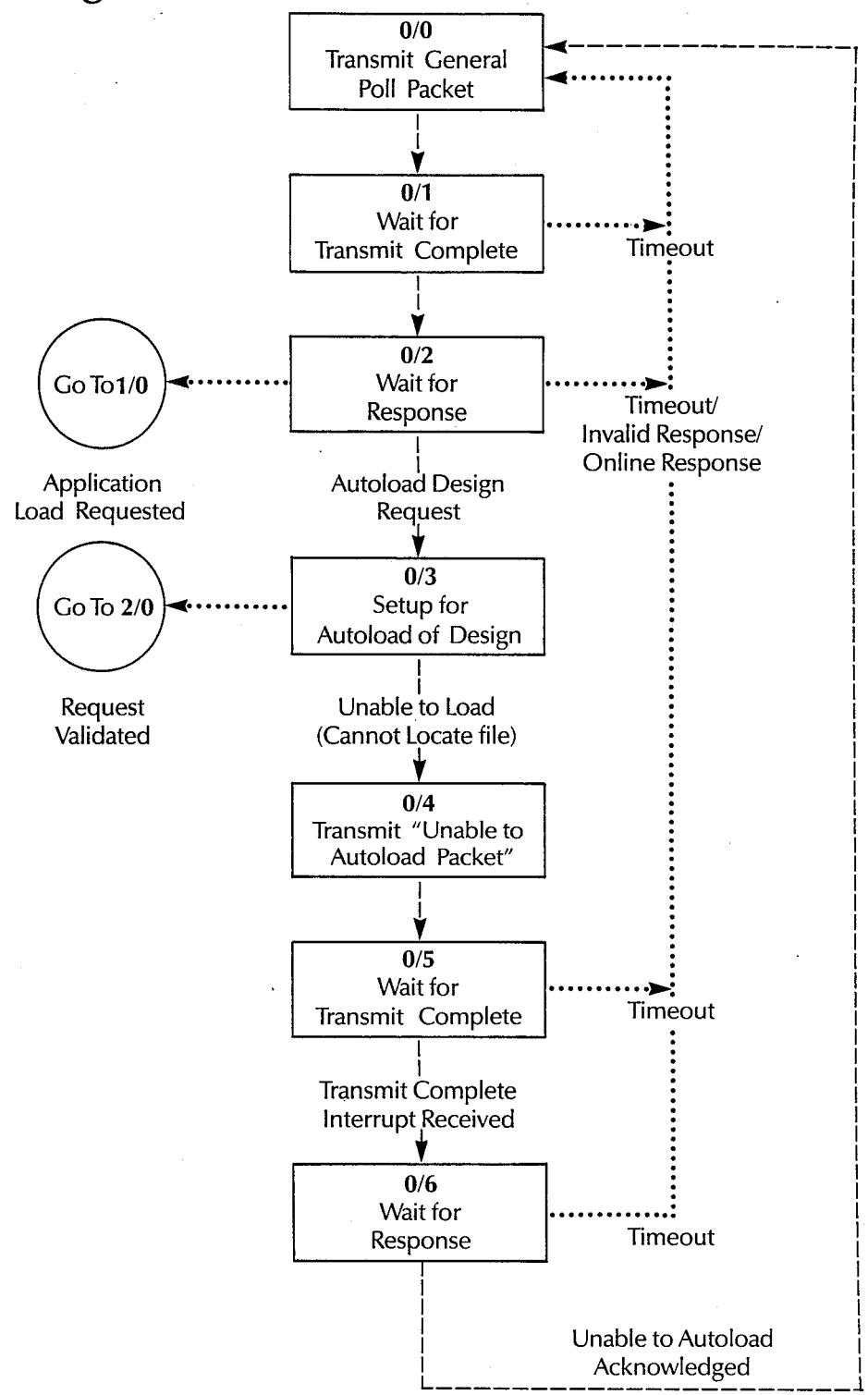
Figure 9:
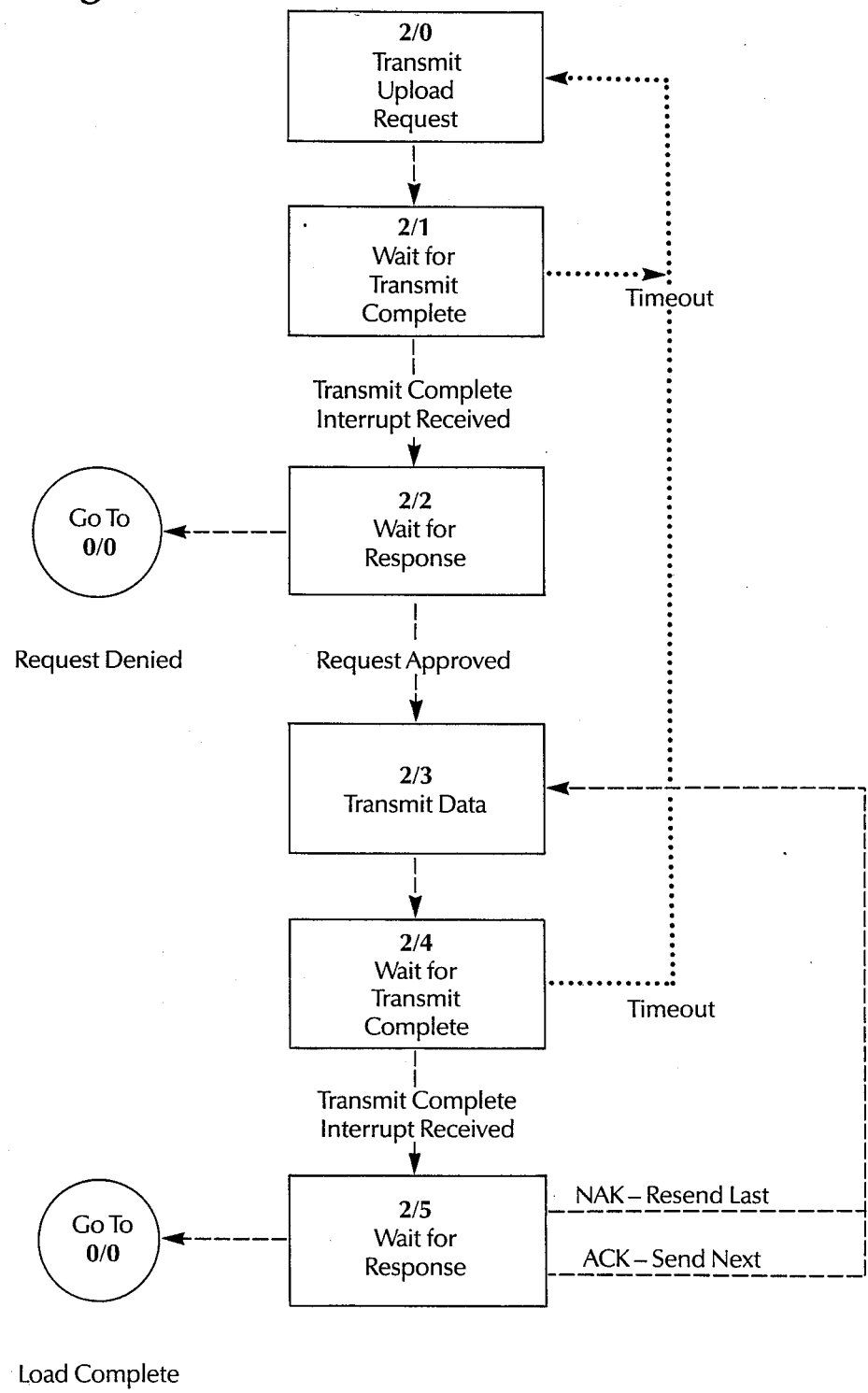

With reference to FIGS. 7–9, all of the possible states for an enabled X-Y peripheral in the preferred embodiment of the system 20 are illustrated. The states will be described first with regard to information transfers that are initiated by the master controller 22 requesting whether the selected X-Y peripheral 48 requires servicing. The states will then be described with regard to information transfers initiated by the master controller 22. The dotted lines indicate that the master controller 22 is unlocked and the dashed lines indicate that the master controller 22 is locked. Consequently, when a selected X-Y peripheral 48 enters a particular state via a dotted line the state, which in the preferred embodiment includes substate, type, and subtype, is recorded for the subsequent processing of the selected X-Y peripheral and the master controller 22 begins servicing of another enabled X-Y peripheral. Similarly, when a selected X-Y peripheral 48 enters a particular state via a dashed line then the master controller 22 continues to process the selected X-Y peripheral 48 until a state is entered by way of a dotted line.

State 0 can be generally defined as the functional relationship between the master controller 22 and a given X-Y peripheral whereby the master controller 22 determines whether the selected peripheral 48 requires servicing. Initially, an enabled X-Y peripheral is in state "0/0". The master controller 22 services the enabled X-Y peripheral having state/substate "0/0" by issuing a general poll packet to the selected X-Y peripheral. Following transmission of the general poll packet in state/substate "0/0" the selected X-Y peripheral 48, since lock is enabled, enters state/substate "0/1" where the master controller waits for an indication that the transmission of the general poll packet is complete. If, either the transmission is not successfully completed or the indication of a successful transmission is not completed within a certain amount of time then the selected X-Y peripheral 48 is returned to state/substate "0/0" and the master controller 22 is unlocked. When the selected X-Y peripheral is subsequently serviced operation will commence in state/substate "0/0". If, on the other hand, an indication is received by the master controller 22 that the general poll packet has been successfully transmitted then the selected X-Y peripheral is placed in state/substate "0/2" where the master controller waits for a response, in the form of an information packet, from the selected X-Y peripheral 48. If, a response is not received in time, an invalid response having the wrong type and subtype is received, or a response indicating that the selected X-Y peripheral does not require any servicing then the selected X-Y peripheral is placed in state/substate "0/0" and the master controller 22 is unlocked. If, on the other hand, a valid response is received from the selected X-Y peripheral then the appropriate action is taken. The master controller 22 determines the validity or invalidity of the response by analyzing the type and subtype fields in the response packet.

A valid response in the preferred embodiment of the system 20 requires either the auto-downloading of design data or the downloading of application software to the selected X-Y peripheral 48. Application software is the software that allows the selected X-Y peripheral to perform its designated X-Y function, e.g. sewing or digitizing. Consequently, for any particular type of X-Y peripheral only one copy of its application software need be kept by the master controller 22. For example, in a system having several of the same type of sewing machine peripherals the master controller 22 can download the same copy of the application software to each of the sewing machine peripherals. Thus, the need and the apparatus for effecting permanent storage of a copy of the application software at each of the X-Y peripherals in the system is eliminated. Further, only the master controller 22 copy of any one application program need be updated rather than having to update a copy in each peripheral. Auto-downloading requires that specified design data be transferred to the selected X-Y peripheral. Typically, auto-downloading is done when recovering from a power-failure or the like. The design data that is auto-downloaded is the data used by a selected X-Y peripheral in performing its designated task. For example, a sewing machine peripheral would use design data to effect a desired pattern on a piece of material. Typically, design data is stored in a compressed format that requires expansion before the selected X-Y peripheral 48 can use it to perform its designated task. Therefore, the master controller 22 in the preferred embodiment decompresses any design data using the data expander 40 before downloading it to the selected X-Y peripheral. Thus, the need for repeating hardware and/or software for expansion of design data in each of the X-Y peripherals 48 in the system is eliminated. It is contemplated that information transfers in response to a request by the selected X-Y peripheral other than the downloading of application software or design data can be accomplished using, preferably, the type/subtype structure in the information packet. Consequently, even though the states described hereinafter are in regard to the downloading of application software and auto-downloading of design data in response to a request by a selected X-Y peripheral it is possible to effect other types of information transfers using the described states.

If, in response to the general poll packet the selected X-Y peripheral 48 responds with a request for the downloading of its application software then the selected X-Y peripheral 48 is placed in state/substate "1/0" which is more fully described hereinafter. If, the selected X-Y peripheral 48 responds with an auto-download request then the master controller 22 is unlocked and the X-Y peripheral enters state/substate "0/3". Thus, when the selected X-Y peripheral 48 is next serviced by the master controller 22 operation will commence in state "0/3" with a determination of whether an auto-download is feasible. If an auto-download is feasible then the selected X-Y peripheral 48 is placed in state/substate "2/0" which is also more fully described hereinafter. If, on the other hand, an auto-download is not possible due, perhaps to the nonexistence of the requested design data, then the selected X-Y peripheral 48 is placed in state/substate "0/4" where the master controller transmits an information packet to the selected X-Y peripheral indicating that it is unable to perform the requested auto-download. Following transmission of the information packet indicating that the requested auto-download is not possible the selected X-Y peripheral 48 is placed in state/substate "0/5" where the master controller 22 waits for an indication that the transmission of the information packet was completed. As with state/substate "0/1" if the indication is not received within a certain amount of time or is not completed then the selected X-Y peripheral 48 is placed in state/substate "0/0" and the master controller 22 is unlocked. If, however, the transmission is completed successfully then the selected X-Y peripheral 48 is placed in state/substate "0/6" to wait for the selected X-Y peripheral's response. Again, if the selected X-Y peripheral fails to respond with a specified amount of time then the selected X-Y peripheral 48 is placed in state/substate "0/0" and the master controller 22 is unlocked. If, however, the selected X-Y peripheral 48 responds with an information packet that acknowledges the master controller's inability to perform the requested auto-download then the selected X-Y peripheral is placed in state/substate "0/0" with the master controller 22 remaining locked. In other words, the entire process is repeated so that the selected X-Y peripheral can pursue alternative courses of action.

State 1, as previously mentioned, is concerned with the downloading of the selected X-Y peripherals 48 application software although other types of information transfer are feasible using State 1. The downloading of application software to a selected X-Y peripheral can be used or thought of as the process whereby the selected X-Y peripheral is initialized. State/substate "1/0" is entered from state/substate "0/2" where the selected X-Y peripheral 48 responded to a general poll packet with a request for the downloading of its application software. In the preferred embodiment, the request for a download of application software is made upon the powering-up of the selected X-Y peripheral 48. More specifically, the packet requesting the download of application software is built by the Basic Input/Output System (BIOS) program that resides in the selected X-Y peripheral's EPROM 64 and is executed by the 8086 processor 58 upon powering-up of the selected X-Y peripheral. In state/substate "1/0" an information packet containing all or a portion of the selected X-Y peripherals 48 application software is transmitted. Once the information packet is transmitted then the selected X-Y peripheral enters state/substate "1/1" to wait for an indication that the transmission is complete. If, this indication is not received within a specified amount of time or the transmission is not completed then the state/substate of the selected X-Y peripheral reverts to "1/0" so that another attempt at transmission of the information packet can be made. Further, the master controller 22 remains locked during the re-attempt. If, however, the requested application software is not available then the selected X-Y peripheral is placed in state 200 and, hence, removed from the servicing loop. If the transmission of a packet of an available application program is completed then the selected X-Y peripheral is placed in state/substate "1/2" where the master controller 22 waits for a response packet. If a response packet is not received within a specified amount of time or an information packet is received that indicates that all of the application software has been received then the selected peripheral is placed in state/substate "0/0" and the master controller 22 is unlocked. Consequently, when the selected X-Y peripheral is subsequently serviced a general poll packet will be transmitted to it. If, however, the response packet indicates that further portions of the application program need to be downloaded then the selected X-Y peripheral is placed in state/substate "1/0" and the entire process is repeated.

State 2, as previously mentioned, is concerned with auto-downloading of design data to the selected X-Y peripheral. Since design data is or can be unique to a particular type of X-Y peripheral it is generally downloaded after the application software is downloaded to the selected X-Y peripheral. In other words, until the application software is downloaded to an X-Y peripheral no other information transfers can occur between the master controller 22 and the selected X-Y peripheral. With reference to FIG. 5, the master controller 22 determines whether the selected X-Y peripherals application software has been downloaded and is being executed by interrogating the "running" flag associated with the X-Y peripheral. State/substate "2/0" involves the transmission of a download request packet from the master controller 22 to the selected X-Y peripheral 48. This allows the master controller 22 to inform the selected X-Y peripheral of certain parameters which the selected may not have been aware of when requesting the download. For example, the master controller 22 may inform the selected X-Y peripheral 48 of the size of the requested download. The selected X-Y peripheral then can decide whether or not it has sufficient resources to accommodate the download. Once the download request packet is sent the selected X-Y peripheral 48 is placed in state/substate "2/1" where the master controller 22 waits for an indication that the transmission is complete. If the transmission is not completed or an indication is not received in time then the selected peripheral is returned to state/substate "2/0" and the master controller is unlocked. Consequently, the master controller 22 proceeds to service other enabled X-Y peripherals in the system 20. Further, when the selected X-Y peripheral is next serviced service will commence with the transmission of a download request as defined by state/substate "2/0". If, however, an indication that the download request was successfully completed then the selected X-Y peripheral is placed in state/substate "2/2" where the master controller 22 waits for a response packet. If, the response packet indicates that the download request is denied then the selected X-Y peripheral 48 enters state/substate "0/0". The master controller 22 remains locked in this situation and a general poll packet is transmitted to the selected X-Y peripheral. Thus, the selected X-Y peripheral is given an opportunity to pursue alternative courses of action. Notably, the request denied can be indicated using the type and subtype fields in the response packet. If, however, the request is approved, as indicated in the type and subtype fields of the response packet, then the selected X-Y peripheral 48 is placed in state/substate "2/3" where the first packet of the requested download is transmitted to the selected X-Y peripheral 48. If the data is in a compressed format then the data expander 40 is used to decompress the data prior to transmission. Following transmission of the first packet the selected X-Y peripheral is placed in state/substate "2/4" where the master controller 22 waits for an indication of a completed transmission. As with state/substate "2/1" if the transmission is incomplete or the indication is not received within a specified amount of time then the selected peripheral is placed in state/substate "2/0" and the master controller 22 is unlocked. If, on the other hand, the indication of a complete transmission is received then the selected X-Y peripheral 48 is placed in state/substate "2/5" where the master controller 22 waits for a response packet. There are three possible types of responses from the selected X-Y peripheral 48. The type of response can be determined using the type and subtype fields in the response packet. First, the selected X-Y peripheral 48 can send a negative acknowledge (NAK) response packet indicating that the packet was not received. In this situation the selected X-Y peripheral 48 is placed in state/substate "2/3", the master controller 22 remains locked and the download is attempted again. The master controller 22 can also receive an acknowledge (ACK) response packet indicating that the downloaded packet was successfully received and that the master controller 22 should send the next packet in the download. Consequently, the selected X-Y peripheral 48 is placed in state/substate "2/3" and the next packet in the download is transmitted. Lastly, the selected X-Y peripheral 48 can respond with a packet indicating that the download is complete. Once the download is complete, the selected X-Y peripheral 48 is placed in state/substate "0/0" and the master controller 22 is unlocked.

Information transfers with a selected X-Y peripheral that do not involve a general poll packet issued to the X-Y peripheral asking whether service is required, but rather initiated by the master controller 22 are accomplished utilizing state 2. Consequently, for such transfers to occur the selected X-Y peripherals application software, generally, has already been downloaded and is running. Thus, the application software can be tailored to process information downloaded by the master controller 22 that is unique to the particular X-Y peripheral thereby further increasing the flexibility of the system 20. Typically, information transfers initiated by the master controller 22 involve the transfer of design data. However, it is contemplated that other forms of master controller initiated transfers are possible. For example, commands and requests for status could be initiated by the master controller 22. In a preferred embodiment of the system 20 there are four possible information transfers are initiated by the master controller: autosend, autoqueue, autodelete and send a design. Preferably, this information transfers are generic to all the types of X-Y peripherals incorporated into the system 20. In other words, the application software of each type of X-Y peripheral accommodated by the system 20 can process these information transfers.

The "send design" information transfers involves the sending of design data from the master controller 22 to a selected X-Y peripheral in the system 20. Typically, the design data to be sent and the selected X-Y peripheral are input to the master controller 22 by a master controller operator using the master controller operator interface 28 although other selection scenarios are also possible. For example, the master controller 22 could be designed to send design data to a selected X-Y peripheral without any input from a master controller operator. In any event the design data is, preferably, decompressed using the data expander 40 and transferred to the selected X-Y peripheral by utilizing the previously described state 2. More specifically, the master controller 22 upon, in the preferred embodiment, receiving an indication from the master controller operator interface 28 that a selected X-Y peripheral is to be sent particular design data it determines if the selected peripheral can be placed in state 2. Generally, if the selected X-Y peripheral is in state/substate "0/0", the general polling packet state, then the selected X-Y peripheral can be placed in state/substate "2/0" for the transfer of design data. Thus, when the master controller 22 next services the selected X-Y peripheral operation will commence in state/substate "2/0" with the transfer of a download request packet, as previously described. If, however, the selected peripheral is in a state that cannot be superseded then the master controller 22 will wait until the selected X-Y peripheral can be placed in state/substate "2/0".

The autosend information transfers from the master controller 22 to a selected X-Y peripheral are used in conjunction with a designated X-Y peripheral. An X-Y peripheral in the system 20 becomes the designated X-Y peripheral, preferably, by interaction of a master controller operator using the master controller operator interface 28. Once designated the X-Y peripheral is subject to the autosend switches which are also, preferably, set by a master controller using the master controller operator interface 28. If, autosend is enabled then design data is automatically sent, but not necessarily placed in the run queue, to the designated X-Y peripheral. The design data used in autosend is that displayed on the monochrome CRT or other output device used in the master controller operator interface 28. Consequently, a master controller operator who utilizes another task being run by the master controller 22 (not described herein) to create a design for the designated X-Y peripheral can, when satisfied, with the design have it automatically sent to the designated X-Y peripheral using this feature. The autosend is effected, as with the "send design" feature, by utilizing state 2 as previously described.

Autoqueue, also preferably enabled by a master controller using a switch at the master controller operator interface 28, results in all designs sent to the selected X-Y peripheral by autosend, send design or auto-download to be queued to run. Autoqueue is also accomplished using state 2. The autoqueue feature is, preferably, defined to the selected X-Y peripheral using the type, subtype, or data fields in the information packet sent in state "2/0" requesting a download. The application software in the selected X-Y peripheral then analyzes the information packet and implements the autoqueue feature, if enabled, with regard to the design data subsequently transferred.

The enabling of the autodelete feature results in design data being deleted from the selected X-Y peripheral's memory after it has completely run. Autodelete is enabled by a master controller using a switch at the master controller operator interface and, is accomplished using state 2/0 to transfer an information packet indicating enablement of the autodelete feature. The selected X-Y peripheral, in turn, implements the autodelete feature with regard to the design data subsequently transferred.

The Microfiche Appendix contains code or software which is utilized in the system 2.

Figure 10:
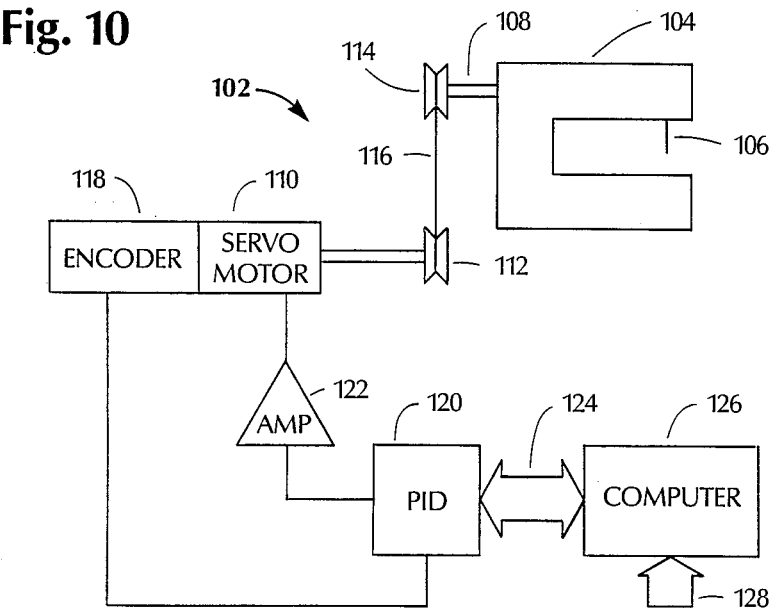
FIG. 10 illustrates the preferred embodiment of the head servo system.

With reference to FIG. 10, the preferred embodiment of a head or tool servo system for use with X-Y type peripherals is illustrated. The head servo system 102 includes a head 104 for moving a tool 106 relative to a workpiece. More specifically, the head servo system 102 controls the movement of the tool 106 in the Z-dimension where the workpiece is in the X-Y dimension. The head 104 further includes a main shaft 108 which, typically, cooperates with a camming member (not shown) to displace the tool 106 in the Z-dimension upon rotation thereof.

Also included in the head servo system 102 is a servo motor 110, a motor pulley 112, a main shaft pulley 114 and a drive belt 116 for rotating the main shaft 108. The servo motor 110, in conjunction with the motor pulley 112, the main shaft pulley 114 and the drive belt 116, cooperate to rotate the main shaft 108 at a velocity and in a direction defined by a drive signal that is input to the servo motor 110. The rotation of the main shaft 108 resulting in the displacement of the tool 106 in the Z-direction. The servo motor 110 further provides information regarding the position of its drive shaft, which can be correlated to the current position of the tool 106, to an encoder.

Further included in the head servo system 102 is an encoder 118 that is operatively connected to the servo motor 110 and provides information regarding the angular position of the main shaft 108 and, hence, the position of the tool 106. Alternatively, the encoder 118 could also be connected to any other moving mechanical part in the head servo system 102 which provides the requisite position information of the tool 106. For example, the encoder 118 could be connected to the shaft pulley 114, the motor pulley 112, the drive belt 116 or directly to the main shaft 108. The encoder 118, preferably, provides two position signals that are in phase quadrature with one another so that the direction of rotation of the main shaft 108 can be determined.

The head servo system 102 further includes a digital proportional-integral-differential servo control 120, hereinafter PID 120, for processing the position information produced by the encoder 118 to provide, in addition to the actual position of the tool 106, information regarding the actual direction and actual velocity of the tool 106 to a computer. In addition, the PID 120 generates a drive signal that is applied to the motor 108 in order to attain a desired direction of travel, position or velocity of the tool 106 as defined by a computer. The drive signal is applied to an amplifier 122 which amplifies the drive signal prior to applying it to the motor 110. The PID 120 includes a PID/computer interface 124, hereinafter interface 124, for transmitting information to and receiving information from a computer. The PID 120 outputs, via the interface 124, information regarding the actual rotational position, rotational velocity and direction of rotation of the main shaft 108 to a computer. As previously mentioned, the actual rotational position, actual rotational velocity and the actual direction of rotation of the main shaft 108 can be correlated to like parameters associated with the tool 106. The interface 124 and, hence, the PID 120 receive information from the computer as to the desired rotational position, rotational velocity and direction of rotation of the main shaft 108. Thus, the computer can define a desired position or velocity for the tool 106 in the Z-direction. In addition, the computer can define the direction of rotation of the main shaft 108 and, hence, the direction of travel in the Z-direction of the tool 106. However, in the computer-controlled sewing machine, a particular type of X-Y peripheral, rotation of the main shaft 108 results in the reciprocation of the tool 106, a needle. Consequently, in this situation the direction of the rotation of the main shaft 108 is of little consequence. Further, the PID 120, receives via the interface 124, control inputs that are defined by the computer whereby the PID 120 is placed in either a direction, position or velocity mode. Consequently, the PID 120 operates as defined by the mode and the associated desired parameter value as defined by the computer to reduce any error or discrepancy between the actual and desired parameter in, essentially, an optimal manner. For example, if the computer input to the PID 120, via the interface 124, a desired position and defined the position mode of operation, then the PID 120 would operate to generate a drive signal that optimally reduces the difference between the desired and actual position thereby positioning the tool 106 at the desired position.

Also included in the head servo system 102 is a computer 126 for communicating with the PID 120 to establish either a desired position or velocity for the tool 106 in response to a head input 128. Preferably, the head input 128 is generated by an operator using the X-Y peripheral. Computer as used herein includes any configuration of hardware and/or software which is capable of generating the necessary information to control the PID 120. Preferably, the computer 126 is a digital computer that is programmed to communicate with the PID 120 via the interface 124 to achieve the desired position and/or velocity of the tool 106. The computer 126 receives actual rotational position, rotational direction and rotational velocity information from the PID 120. Further, the computer 126 inputs to the PID 120 the desired rotational position, rotational direction and rotational velocity of the main shaft 108 which will result in the desired positioning and/or velocity of the tool 106 in the Z-direction. In addition, the computer 126 defines to the PID 120 through the interface 124 the mode of operation which, as previously described, is a direction, position or velocity mode.

The elements or components comprising the preferred embodiment of the head servo system having been described, it is now necessary to describe the operation thereof. Operation of the head servo system 102 provides both position and velocity control of the tool 106. Consequently, operation of the head servo system 102 will be described first with respect to velocity control and second with respect to position control.

Velocity control of the tool 106 is initiated by the head input 128. Typically, the input is the result of operator interaction with the X-Y peripheral. However, the input 128 could also be generated in response to other stimuli in the X-Y peripheral. For example, the input 128 could be generated as the result of an instruction embedded within the data defining the X-Y movement of the workpiece relative to the tool 106. For example, in a computer-controlled sewing machine the X-Y peripheral typically receives data defining X-Y movement of the workpiece relative to a needle. The data could also contain information regarding the desired velocity for the needle thereby achieving a particular stitch length in the workpiece. The computer 126 in response to the head input 128 via the interface 124, places the PID 120 in velocity mode and defines the desired velocity for the tool 106. Also input to the PID 120 is the position signal output by the encoder 118. The PID 120 uses the position signal output by the encoder 118 to determine the current velocity of the tool 106. Based upon the current velocity of the tool 106 and the desired velocity as defined by the computer 126 the PID 120 generates a drive signal to reduce, in an optimal manner, any difference therebetween. The drive signal is amplified by the amplifier 122 and then applied to the servo motor 110. Thus, the desired velocity of the tool 106 in the Z-direction is achieved.

The head servo system 102 is also capable of providing position control of the tool 106. Position control is initiated, as with velocity control, by the head input 128. The computer 126 in response to the head input 128 places the PID 120, via the interface 124, in position mode and defines the desired position for the tool 106. Also input to the PID 120 is the current position of the tool 106 as indicated by the output of the encoder 118. The PID 120 then produces a drive signal that optimally reduces any difference between the desired and actual positions of the tool 106. The drive signal is first applied to the amplifier 122 where it is amplified and then input to the servo motor 110. The servo motor 110 responds to the drive signal by using the previously-described linkage, to position the tool 106 at the desired position.

A preferred embodiment of the head servo system 102 is in a computer-controlled sewing machine, a particular type of X-Y peripheral, where the position control provides, among other things, the ability to implement a color change head and reduce the down time of the sewing machine for maintenance purposes. In order to implement a color change head in a computer-controlled sewing machine, the tool 106 or needle in this case must be positioned within $\pm 2°$ of top dead center. The color change is initiated by the head input 128 informing the computer 126 that the head must be positioned within $\pm 2°$ of top dead center. The computer 126 then communicates with the PID 120 via the interface 124 the desired position, i.e. top dead center, and places the PID 120 in position mode. The current position of the tool 106 is also input to the PID 120 by the encoder 118. The PID 120 then generates a drive signal based upon the difference between the actual and desired position at top dead center. The drive signal is applied to the amplifier 122 which amplifies the signal and, in turn, applies it to the servo motor 110. The servo motor 110, previously-described linkage, then positions the tool 106 at the top dead center position. Once at top dead center, the thread color can be changed automatically using a color change head.

The position control provided by the head servo system 102 also reduces the down time associated with various maintenance procedures performed on a computer-controlled sewing machine. Among the maintenance procedures performed on a computer-controlled sewing machine is the correction of timing between the reciprocating needle and the bobbin, as is well-known in the art. If the reciprocation of the needle and the bobbin is not properly coordinated then the sewing machine will not stitch properly. The head servo system 102 provides the position control to reduce the time necessary to adjust the timing between the needle and the bobbin. Specifically, the head servo system 102 is employed to first position the needle at top dead center as previously described with regards to the color change operation. From the top dead center position, the head servo system 102 is then employed to rotate the main shaft 108 to the bottom dead center position. From the bottom dead center position, the head servo system 102 is then utilized to achieve a further rotation of the main shaft 108 at which an operator can inspect the spatial orientation of the needle relative to the hook and make any adjustment required. In particular, an operator adjusts the Z-position of the needle such that the required relationship between the needle and the hook for good quality stitches is achieved.

The head servo system 102 can be employed to rotate the main shaft 108 in incremental steps thereby, also, achieving incremental movements of the needle. Specifically, the head servo system 102 is employed to rotate the main shaft 108 in, preferably, steps of $\pm 1.8°$ and $\pm 18°$. By rotating the main shaft 108 in 18° increments, binding problems typically caused by the malfunctioning of bearings associated with the main shaft 108 can be quickly detected and corrected. Rotation of the main shaft 108 in steps of $\pm 1.8°$, similarly, allows an operator to inspect and correct any rotational misalignment of the hook.

Figure 11:
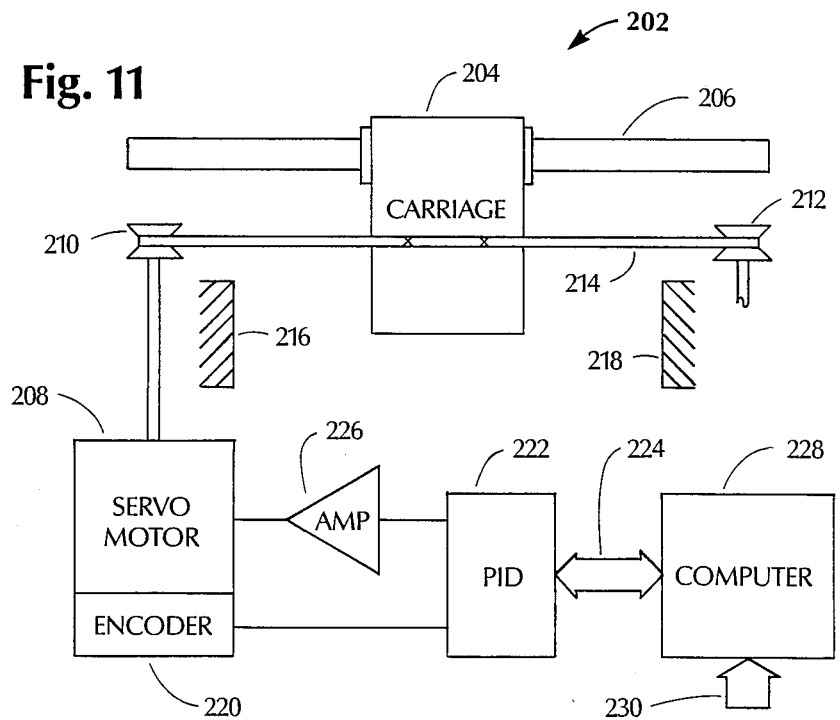
FIG. 11 is a schematic representation of the preferred embodiment of the home positioning invention.

With reference to FIG. 11, the preferred embodiment of a home positioning system 202 is illustrated. The home positioning system 202 includes a carriage 204 for holding a workpiece and moving it relative to a tool in order to achieve a design or pattern on the workpiece. For example, the carriage 204 in a computer controlled sewing machine typically includes a hoop or similar device for holding the material to be embroidered. The carriage 204 is then moved relative to a reciprocating needle in order to achieve the desired pattern upon the material. Alternatively, the tool could be attached to a carriage and moved relative to a stationary workpiece.

The home positioning system 202 also includes a bearing rail 206 that is operatively attached to the carriage 204 by a bushing or similar device. The bearing rail 206 operates to constrain the motion of the carriage 204 to a single dimension, i.e. either the X or Y dimension in an X-Y type peripheral.

Also included in the home positioning system 202 is the well-known combination of a motor 208, a motor pulley 210, an idler pulley 212 and a drive belt 214 for displacing the carriage 204 along the bearing rail 206. The drive belt 214 is operatively attached to the carriage 204. The motor 208, in conjunction with the motor pulley 210, the idler pulley 212 and the drive belt 214, cooperate to drive the carriage 204 along the bearing rail 206 at a velocity and in a direction defined by a drive signal that is input to the motor 208.

The home positioning system 202 is further comprised of a first mechanical stop 216 and a second mechanical stop 218 for limiting the movement of the carriage 204 in either direction along the bearing rail 206. The home position, in the dimension in which the carriage 204 is constrained by the bearing rail 206, is a defined positional relationship between an arbitrary point on the carriage 204, or any other moving part, and an arbitrary point associated with the first or second mechanical stops 216, 218 or any other stationary point on the body of the X-Y peripheral. The home position is, in essence, a reference point or known position from which various operations associated with the X-Y peripheral can commence or continue. Typically, in a computer controlled sewing machine the carriage 204 is placed at the home position following such events as a power-up and as part of a power-failure recovery routine where the current position of the carriage relative to the head or tool is unknown or uncertain. Further, the carriage 204 may be placed at the home position prior to the sewing or embroidering of a new piece of material. In this situation, the current position of the carriage 204 is generally known.

Also included in the home positioning system 202 is an encoder 220 that is operatively connected to the motor 208 and provides information regarding the actual position of the carriage 204 relative to a stationary point on the body of the X-Y peripheral. Typically, either the first or second mechanical stop 216, 218. The encoder 220, preferably, provides two position signals that are in phase quadrature with one another so the direction of travel of the carriage 204 can be determined.

The home positioning system 202 also includes a digital proportional-integral-differential servo control 222, hereinafter PID 222, for processing the actual position information produced by the encoder 220 to provide, in addition to the actual position of the carriage 204, information regarding the direction and velocity of the carriage 204 to a computer. In addition, the PID 222 generates a drive signal that is applied to the motor 208 in order to attain a desired direction of travel, position or velocity of the carriage 204 as defined by a computer. The drive signal is applied to an amplifier 226 which amplifies the drive signal before applying it to the motor 208. The PID 222 includes a PID/computer interface 224, hereinafter interface 224, for transmitting information to and receiving information from a computer. The PID 222 outputs, via the interface 224, to a computer information regarding the actual position, direction and velocity of the carriage 204. The interface 224 and, hence, the PID 222 receive information from the computer regarding the desired direction, position and velocity of the carriage 204. The PID 222 having both actual and desired information regarding the status of the carriage 204 is also capable of outputting information to a digital computer regarding the difference or error between the actual and desired status of the carriage 204. Further, the PID 222 receives, via the interface 224, control inputs that are defined by the computer whereby the PID 222 is placed in either a direction, position or velocity mode. Consequently, the PID 222 operates as defined by the mode and the associated desired parameter value as defined by the computer to reduce any error or discrepancy between the actual and desired parameter in, essentially, an optimal manner. For example, if the computer input to the PID 222 via the interface 224 a desired position and defined the position mode of operation then the PID 222 would operate to generate a drive signal that optimally reduces the difference between the desired position and the actual position thereby positioning the carriage at the desired position.

Also included in the home positioning system 202 is a computer 228 for, in response to a home input 230, communicating with the PID 222 to position the carriage 204 at a defined home position. The home input 230 can be generated as a consequence of any of the previously defined conditions, e.g. power failure recovery. Although, it is contemplated that there are other conditions warranting a home input 230. Computer as used herein includes any configuration of hardware and/or software which is capable of generating the necessary information to control the PID to position the carriage 204 at the defined home position. The preferred embodiment of the computer 228 is a programmed digital computer that communicates with the PID interface 224 to place the carriage 204 at the home position in response to a home input 230. The computer 228 receives actual position, direction and velocity information from the PID 222. Further, the computer 228 inputs to the PID 222 the desired position, direction and velocity of the carriage 204. Since the computer 228 also has the actual and desired status of the carriage it is also, like the PID 222, capable of generating error signals indicative of the difference be the actual and desired position, direction or velocity of the carriage 204.

Figure 12:
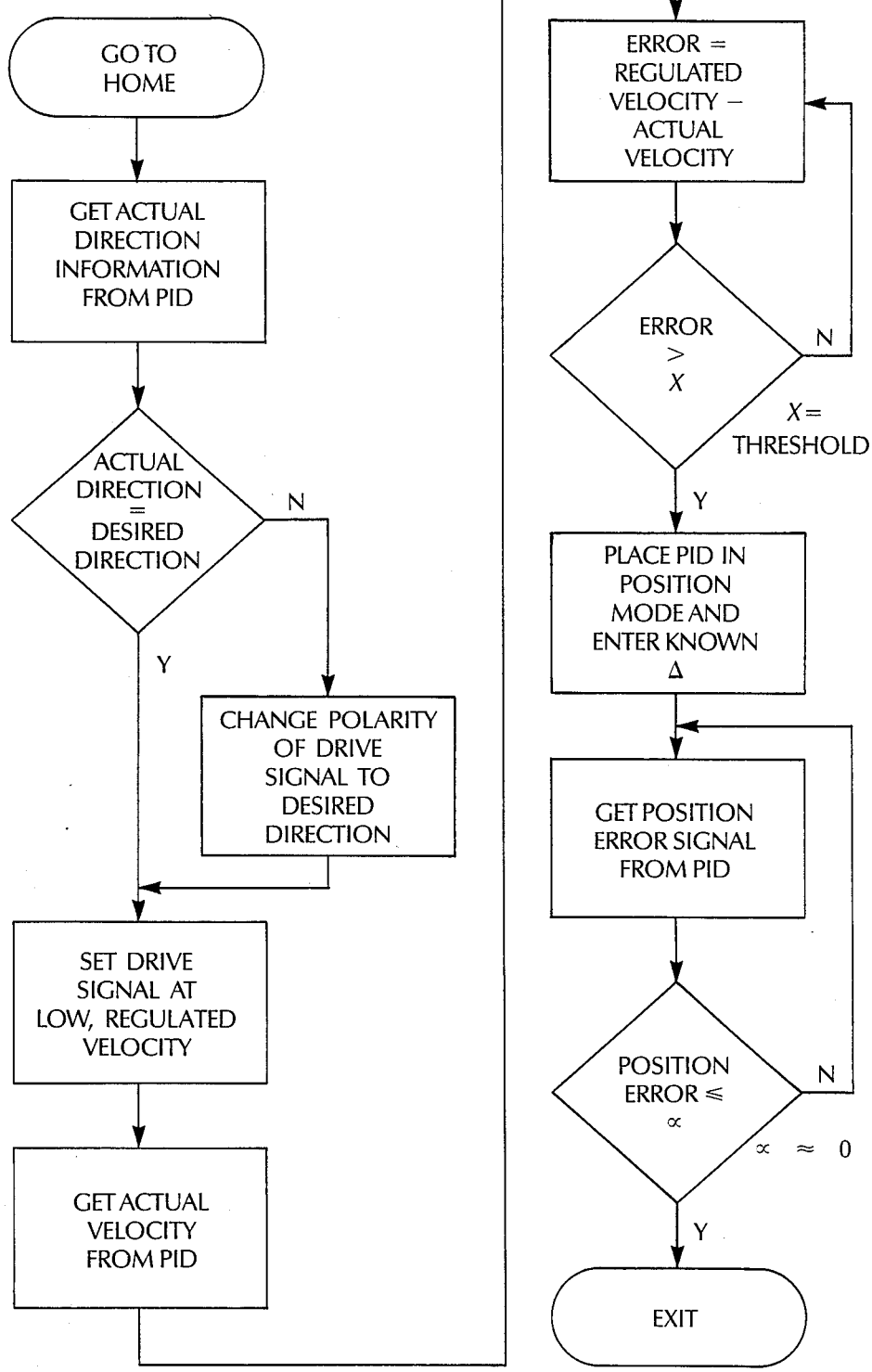
FIG. 12 is a flow chart of certain steps associated with the home positioning invention.

Having described the elements or components comprising the preferred embodiment of the home positioning system 202 it is now necessary to describe its operation. With reference to FIG. 12, the process, as implemented by a software program residing in the computer 228, whereby the computer 228 causes the carriage 204 to be positioned at the home position is illustrated. Initially, the computer 228 communicates with the PID 222 by the interface 224 to obtain the actual direction of movement of the carriage 204. The computer 228 then compares the actual direction of travel to the desired direction of travel for the carriage 204. If the carriage 204 is not travelling in the desired direction then the computer 228 communicates with the PID 222 by the interface 224 to establish the desired direction of travel of the carriage 204. Consequently, the carriage 204 is directed to move either toward the first mechanical stop 216 or the second mechanical stop 218 depending upon the desired direction of travel.

Once the desired direction of travel is established, the computer 228 then defines a low, regulated velocity for the carriage 204 by communicating with the PID 222 via the interface 224. The low, regulated velocity of the carriage 204 is utilized to reduce any adverse effects upon impact of the carriage 204 with either the first or second mechanical stop 216, 218.

Alternatively, the computer 228 can simply input to the PID 222, via the interface 224, the desired direction and velocity of travel for the carriage 204 without first determining the current direction of travel. Further, the desired direction of travel can be specified simulataneously with the desired velocity by using the sign or polarity of the desired velocity signal to define the desired direction of travel.

The computer 228 then proceeds to monitor the velocity error signal, the difference between the defined velocity and the actual velocity of the carriage. The velocity error is, essentially, zero while the carriage 204 is moving intermediate the first and second mechanical stops 216, 218. Once, however, the carriage 204 comes into contact with either the first or second mechanical stop 216, 218, the carriage 204 is halted and the velocity error increases. By monitoring the velocity error, the computer 228 can be assured that the carriage 204 is in a known position, i.e. against either the first or second mechanical stop 216, 218, when the velocity error exceeds a threshold. Thus, the carriage 204 has been moved from a random position intermediate the first and second mechanical stops 216, 218 to a known position abutting one of the mechanical stops 216, 218.

Once the carriage 204 is in the known position then the computer 228 causes the carriage 204 to move to the home position by using the interface 224 to place the PID 222 in position mode and communicating the known distance or delta between the current position of the carriage 204 at one of the mechanical stops 216, 218, and the home position.

The computer 228 then monitors the position error to determine when the position error is approximately zero. A position error of approximately zero being indicative that the carriage 204 is located at the home position. Thus, the carriage 204 is moved from a random position to a known position as defined by one of the mechanical stops 216, 218 and then to the home position as defined by a known delta between one of the mechanical stops 216, 218 and the defined home position.

The home positioning system 202, as would be apparent to those skilled in the art, can be expanded to accommodate multi-dimensional home positioning. Further, if the home positioning system 202 is expanded to accommodate home positioning in, for example, two dimensions then the carriage 204 could be positioned according to any conceivable sequence.

Several variations of the above-described process are also possible. First, rather than moving the carriage 204 in a defined direction, the carriage 204 is allowed to travel in the same direction it is already travelling in. Thus, the carriage 204 proceeds undisturbed to either the first mechanical stop 216 or the second mechanical stop 218. The direction of travel as provided by the PID 222 to the computer 228 being used to determine which of the mechanical stops 216, 218 the carriage 204 will engage. The computer 228 using the known distance between the first mechanical stop 216 and the second mechanical stop 218, and the delta from one or the other of the mechanical stops 216, 218 and the home position, can determine the delta from either mechanical stop to the home position. This method has the advantage that the direction of travel of the carriage 204 need not be changed, however, two delta values must be retained and determined.

Another possible process for attaining the home position is to define the home position to be at either the first mechanical stop 216 or the second mechanical stop 218. The delta in this scenario is zero. Consequently, with reference to FIG. 12, the home position is attained upon the velocity error exceeding the threshold.

Another possible scenario is to calculate the shortest path to the home position using the delta from the first mechanical stop 216 and the delta from the second mechanical stop 218 to the home position. The actual position of the carriage 204 must be provided to the computer 228 in this scenario. Thus, the carriage 204 would be moved to whichever mechanical stop provided the minimum amount of travel to the home position. The carriage 204 can then be moved from the known position defined by one or the other of the mechanical stops 216, 218 to the home position. Since the carriage 204 can be positioned at either mechanical stop the deltas from each mechanical stop to the home position must be determined. This process has the advantage of attaining the home position in the fastest possible manner, but also requires additional processing and the retention or determination of two delta values.

Yet another possible variation is to use a position error signal rather than a velocity error signal. In this situation the computer 228 places the PID 222 in position mode and defines a desired position that is beyond one or the other of the mechanical stops 216, 218. The computer 228 then monitors the position error to determine when the carriage 204 is in contact with one or the other of the mechanical stops 216, 218. Specifically, a decreasing or changing error signal indicates to the computer 228 that the carriage 204 is moving and hence located intermediate the mechanical stops 216, 218. The position error signal will, however, become constant when the carriage 204 comes into contact with, and is prevented from attaining the desired position by, one or the other of the mechanical stops 216, 218. The carriage 204 now being at a known position the computer 228 can communicate with the PID 222 via the interface 224 to move the carriage a known delta to the home position as previously described.

What is claimed is:

1. A method for moving a carriage in a sewing machine from a random position to a reference position relative to a stationary body, comprising:
    moving a carriage in a first direction from a random position towards a known position;
    using a signal to determine when said carriage reaches said known position; and
    moving said carriage in a second direction a known distance to a reference position.

2. A method, as claimed in claim 1, wherein:

said step of using a signal includes using a velocity signal to determine when said carriage reaches said known position.

3. A method, as claimed in claim 2, wherein:
said step of using a velocity signal includes using a velocity error signal to determine when said carriage reaches said known position.

4. A method, as claimed in claim 3, wherein:
said step of using a velocity error signal includes comparing said velocity error signal to to a threshold to determine when said carriage reaches said known position.

5. A method, as claimed in claim 1, wherein:
said step of using a signal includes using a position signal to determine when said carriage reaches said known position.

6. A method, as claimed in claim 1, wherein:
said step of using a position signal includes using a position error signal to determine when said carriage reaches said known position.

7. A method, as claimed in claim 6, wherein:
said step of using a position error signal includes using a constant position error signal to determine when said carriage reaches said known position.

* * * * *